(12) United States Patent
Kim et al.

(10) Patent No.: US 12,518,643 B2
(45) Date of Patent: Jan. 6, 2026

(54) METHOD AND APPARATUS FOR MANAGING FLIGHT PLAN

(71) Applicant: PABLO AIR Co., Ltd., Incheon (KR)

(72) Inventors: Hyeong Min Kim, Incheon (KR); Seung Han Lim, Daejeon (KR); Youngjoon Kim, Incheon (KR)

(73) Assignee: PABLO AIR Co., Ltd., Incheon (KR)

( * ) Notice: Subject to any disclaimer, the term of this patent is extended or adjusted under 35 U.S.C. 154(b) by 167 days.

(21) Appl. No.: 18/146,717

(22) Filed: Dec. 27, 2022

(65) Prior Publication Data
US 2023/0206773 A1    Jun. 29, 2023

(30) Foreign Application Priority Data

Dec. 27, 2021  (KR) .......................... 10-2021-0188552
Sep. 16, 2022  (KR) .......................... 10-2022-0116798

(51) Int. Cl.
*G08G 5/55*       (2025.01)
*B64C 39/02*      (2023.01)
(Continued)

(52) U.S. Cl.
CPC ............. *G08G 5/55* (2025.01); *B64C 39/024* (2013.01); *G08G 5/32* (2025.01); *G08G 5/57* (2025.01)

(58) Field of Classification Search
CPC .. G08G 5/0069; G08G 5/0034; G08G 5/0013; G08G 5/0021; G08G 5/0026;
(Continued)

(56) References Cited

U.S. PATENT DOCUMENTS

2010/0191458 A1   7/2010  Baker et al.
2020/0118450 A1*  4/2020  Gariel .................. G05D 1/0088
(Continued)

FOREIGN PATENT DOCUMENTS

JP        2021-039744 A    3/2021
KR   10-2018-0026883 A    3/2018
(Continued)

OTHER PUBLICATIONS

An Office Action mailed by the Korean Intellectual Property Office on Jun. 25, 2024, which corresponds to Korean Patent Application No. 10-2022-0116798 and is related to U.S. Appl. No. 18/146,717.
(Continued)

*Primary Examiner* — Tiffany P Young
*Assistant Examiner* — Ashleigh Nicole Turnbaugh
(74) *Attorney, Agent, or Firm* — Studebaker Brackett PLLC

(57) ABSTRACT

The present disclosure according to at least one embodiment provides a a method for managing, by a computing device, a flight plan of an unmanned aerial vehicle, the method comprising: receiving input information including a departure location and a destination of the unmanned aerial vehicle, inputting the input information into a pre-constructed artificial intelligence model, acquiring at least one of a travel path, a takeoff scheme, an altitude climb scheme at the departure location, an arrival scheme at the destination, or a landing scheme on the destination from the artificial intelligence model, and providing a flight plan including the acquired at least one of the travel path, the takeoff scheme, the altitude climb scheme at the departure location, the arrival scheme as the destination, and the landing scheme on the destination.

10 Claims, 8 Drawing Sheets

(51) Int. Cl.
*G08G 5/32* (2025.01)
*G08G 5/57* (2025.01)

(58) Field of Classification Search
CPC .... G08G 5/0039; G08G 5/0043; G08G 5/006; G08G 5/0065; G08G 5/0082; G08G 5/0091; G08G 5/025; G08G 5/003; B64C 39/024; B64U 70/00; B64U 70/40; B64U 2201/10
USPC ......................................................... 701/120
See application file for complete search history.

(56) References Cited

U.S. PATENT DOCUMENTS

| 2021/0043092 | A1* | 2/2021 | Tillotson | G08G 5/0034 |
| 2021/0383706 | A1* | 12/2021 | Gibbons, II | G08G 5/26 |
| 2022/0148442 | A1* | 5/2022 | Ladurini | G08G 5/0069 |
| 2024/0230358 | A1* | 7/2024 | Sharifi | G01C 21/3694 |

FOREIGN PATENT DOCUMENTS

| KR | 10-2019-0056942 | A | | 5/2019 |
| KR | 10-2020-0058947 | A | | 5/2020 |
| KR | 20200058947 | A | * | 5/2020 |
| KR | 10-2020-0138561 | A | | 12/2020 |
| KR | 10-2212682 | B1 | | 2/2021 |
| KR | 10-2021-0077635 | A | | 6/2021 |
| KR | 10-2299295 | B1 | | 9/2021 |

OTHER PUBLICATIONS

A Notice of Allowance mailed by the Korean Ministry of Intellectual Property on Aug. 25, 2025, which corresponds to Korean Patent Application No. 10-2022-0116798 and is related to U.S. Appl. No. 18/146,717.

* cited by examiner

Flight plan management device

FIG. 3

| Input information | | | |
|---|---|---|---|
| Departure location | Destination | Required time | Preference |
| Yeongjong | Songdo | Within one hour | shortest distance flight |
| Cheongna | Gyeyang | Within two hours | shortest time flight |
| Gyeyang | | No matter | longest distance flight |
| | | | longest time flight |
| | | | maximum payload flight |
| | | | battery saving flight |
| | | | maximum operation time flight |
| | | | maximum operation distance flight |

METHOD AND APPARATUS FOR MANAGING FLIGHT PLAN

CROSS-REFERENCE TO RELATED APPLICATION

This application claims priority from Korean Patent Application No. 10-2021-0188552 filed on Dec. 27, 2021, and Korean Patent Application No. 10-2022-0116798 filed on Sep. 16, 2022, in the Korean Intellectual Property Office, and all the benefits accruing therefrom under 35 U.S.C. 119, the contents of which in its entirety are herein incorporated by reference.

BACKGROUND

Field

The present disclosure relates to a method and device for managing a flight plan. More specifically, the present disclosure relates to a method and device for managing a flight plan that establishes and provides a flight plan in consideration of a user's preference, destination, a flight environment, and the like.

Description of Related Art

Today, unmanned aerial vehicles such as drones are being used in various fields. For example, the unmanned aerial vehicles are used in broadcasting, agriculture, and military fields.

Furthermore, a technology for delivering articles or goods using the unmanned aerial vehicle is currently being developed. In other words, research is being conducted on a service that delivers the articles or goods to a designated place in a state in which the unmanned aerial vehicle is loaded with the articles or goods. Using the unmanned aerial vehicle for the delivery not only saves a labor cost, but also delivers the articles or goods quickly to an area which it is difficult for a vehicle to reach, such as mountainous areas and islands.

This unmanned aerial vehicle travels to a designated destination according to a preset travel path. However, when the unmanned aerial vehicle flies in a city, a crash may occur under an uncertain situation. When the unmanned aerial vehicle crashes, a human accident or property damage may occur due to the collision with the falling flight vehicle.

In order to prevent the accident, simulation is performed on travel of the unmanned aerial vehicle according to a travel path to verify stability thereof. However, a conventional flight simulation method only simulates the travel path based on insufficient input information such as a destination and a departure location, and does not consider various situations. Further, a result of the conventional flight simulation only provides a limited result such as a travel path, etc., but does not provide various results.

SUMMARY

One technical purpose to be achieved by the present disclosure is to provide a method and device for managing a flight plan for establishing a flight plan of an unmanned aerial vehicle in consideration of various situations such as a flight environment, a traffic, and a user's preference.

Another technical purpose to be achieved by the present disclosure is to provide a method and device for managing a flight plan that constructs an artificial intelligence model used to establish a flight plan.

Still another technical purpose to be achieved by the present disclosure is to provide a method and device for managing a flight plan that generates a flight plan including various information such as an altitude climb scheme, a takeoff scheme, a landing scheme, etc.

Still yet another technical purpose to be achieved by the present disclosure is to provide a method and device for managing a flight plan capable of providing a user with a plurality of flight plans based on the user's preferences.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

According to an aspect of the present disclosure, there is provided a method for managing, by a computing device, a flight plan of an unmanned aerial vehicle, the method comprising: receiving input information including a departure location and a destination of the unmanned aerial vehicle, inputting the input information into a pre-constructed artificial intelligence model, acquiring at least one of a travel path, a takeoff scheme, an altitude climb scheme at the departure location, an arrival scheme at the destination, or a landing scheme on the destination from the artificial intelligence model, and providing a flight plan including the acquired at least one of the travel path, the takeoff scheme, the altitude climb scheme at the departure location, the arrival scheme as the destination, and the landing scheme on the destination.

According to another aspect of the present disclosure, there is provided a method for managing, by a computing device, a flight plan of an unmanned aerial vehicle, the method comprising: inputting a departure location and a destination of the unmanned aerial vehicle, and preference information to an artificial intelligence model such that the artificial intelligence model outputs a plurality of flight plans, wherein each of the plurality of flight plans includes a flight score as a numerical value by which each flight plan meets the preference information, and selecting at least one of the plurality of flight plans, based on the flight score.

According to yet another aspect of the present disclosure, there is provided a computing device comprising: at least processor, a memory for loading thereon a computer program executed by the processor, and storage for storing therein the computer program, wherein the computer program includes instructions for: receiving input information including a departure location and destination of an unmanned aerial vehicle, inputting the input information to a pre-constructed artificial intelligence model, acquiring at least one of a travel path, a takeoff scheme, an altitude climb scheme at the departure location, an arrival scheme at the destination, or a landing scheme on the destination from the artificial intelligence model, and generating a flight plan including the acquired at least one of the travel path, the takeoff scheme, the altitude climb scheme at the departure location, the arrival scheme at the destination, and the landing scheme on the destination.

The specific details of other embodiments are included in the detailed description and drawings.

BRIEF DESCRIPTION OF DRAWINGS

The above and other aspects and features of the present disclosure will become more apparent by describing in detail embodiments thereof with reference to the attached drawings, in which:

FIG. 3 is a diagram illustrating an input interface capable of receiving input information;

DETAILED DESCRIPTIONS

Figure 1:
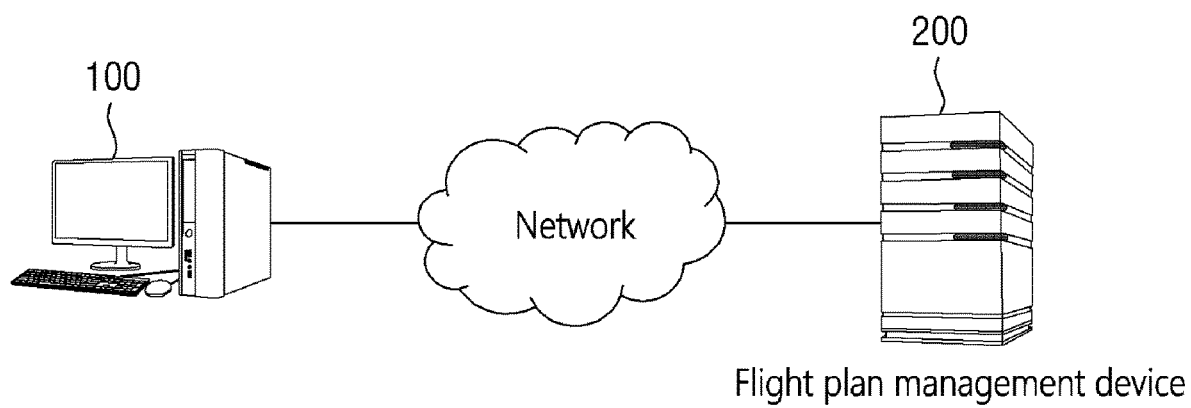
FIG. 1 is a diagram showing a configuration of a system for managing a flight plan according to an embodiment of the present disclosure.

Hereinafter, preferred embodiments of the present disclosure will be described with reference to the attached drawings. The advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present disclosure will be described in detail with reference to the accompanying drawings.

FIG. 1 is a diagram showing a configuration of a system for managing a flight plan according to an embodiment of the present disclosure.

As as shown in FIG. 1, a flight control system according to an embodiment of the present disclosure may include a user terminal 100 and an device 200 for managing a flight plan. The user terminal 100 and the device 200 may communicate with each other through a network. The network includes a wireless communication network and a wired communication network, and may support the communication between the user terminal 100 and the device 200 for managing the flight plan.

The user terminal 100 may be a computing device possessed by a user who wishes to establish a flight plan of an unmanned aerial vehicle, and may transmit input information related to flight to the device 200 for managing the flight plan. The input information may include one or more of a departure location, a destination, a stopover, an unmanned aerial vehicle model, and preference information. In this regard, each of the departure location, the destination, and the stopover may be provide in a form of a GNSS (Global Navigation Satellite System) coordinate or an administrative address.

Further, the preference information indicates a user's preference that should be considered first when the unmanned aerial vehicle autonomously flies. The preference information may include at least one of a shortest distance flight, a shortest time flight, a longest distance flight, a longest time flight, a maximum payload flight, a battery saving flight, a maximum operation time flight, and a maximum operation distance flight. In this regard, the maximum payload flight may indicate a flight of the unmanned aerial vehicle to a destination in a state in which the unmanned aerial vehicle loads articles or goods of an allowed weight thereon.

The maximum operation time flight may be a flight for a maximum flight time of the unmanned aerial vehicle recommended by a manufacturing company of the unmanned aerial vehicle. The maximum flight operation time may vary based on a model of the unmanned aerial vehicle. The model-based maximum flight operation time of the unmanned aerial vehicle may be stored in the device 200 for managing the flight plan. Further, the maximum operation distance flight may be a flight up to a flight maximum travel distance of the unmanned aerial vehicle recommended by the manufacturing company of the unmanned aerial vehicle. The maximum operation distance may vary based on the model of the unmanned aerial vehicle. The model-based maximum flight operation distance of the unmanned aerial vehicle may be stored in the device 200 for managing the flight plan.

The user terminal 100 may receive a flight plan including at least one of a travel path, a takeoff scheme, an altitude climb scheme at a departure location, an arrival scheme at a destination, and a landing scheme on a destination from the device 200 for managing the flight plan.

The device 200 for managing the flight plan may construct an artificial intelligence model for establishing the flight plan. The device 200 for managing the flight plan may input the input information received from the user terminal 100 to the artificial intelligence model, and may generate the flight plan of the unmanned aerial vehicle based on data obtained from the artificial intelligence model. Further, the device 200 for managing the flight plan may transmit the generated flight plan to the user terminal 100. The device 200 for managing the flight plan may be a computing device such as a server.

Hereinafter, referring to FIG. 2 to FIG. 7, a method in which the device 200 for managing the flight plan according to an embodiment of the present disclosure manages the flight plan of the unmanned aerial vehicle, based on the input information received from the user terminal 100, and using the artificial intelligence model.

Figure 2:
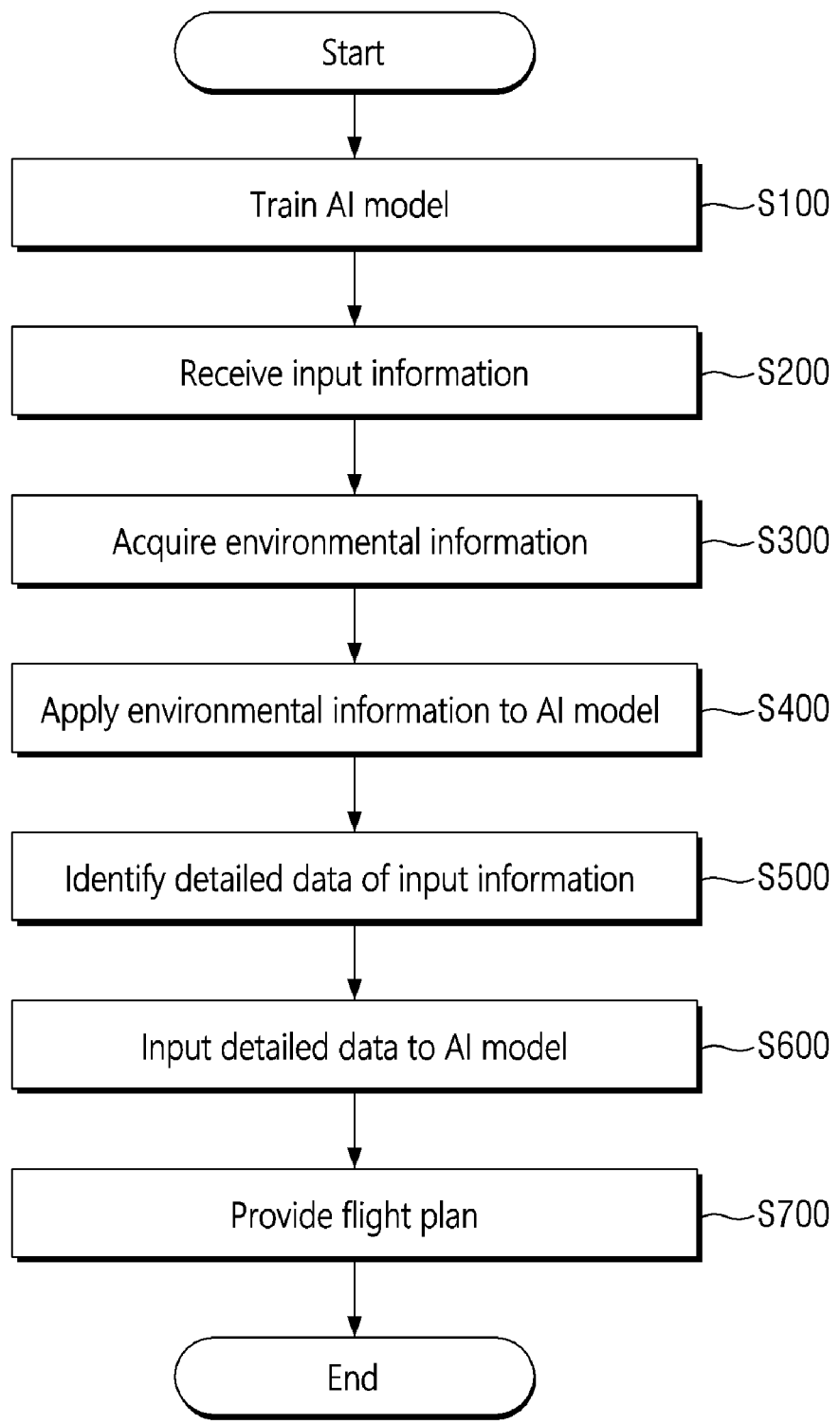
FIG. 2 is a flowchart illustrating a method of managing a flight plan of an unmanned aerial vehicle according to an embodiment of the present disclosure.

FIG. 2 is a flowchart for illustrating a method of managing a flight plan of an unmanned aerial vehicle according to an embodiment of the present disclosure.

Each of operations of the method as shown in FIG. 2 may be performed by the computing device. In other words, each of the operations of the method may be implemented based on one or more instructions executed by a processor of the computing device. First operations included in the method may be performed by a first computing device, and second operations of the method may be performed by a second computing device. Hereinafter, the description will be made with assuming that each of the operations of the method is performed by the device 200 for managing the flight plan as one computing device. A subject which performs each of the operations is only an example. The present disclosure is not limited to the following description. For convenience of description, description of a subject which performs each of some operations included in the method may be omitted.

Referring to FIG. 2, the device 200 for managing the flight plan may train and construct the artificial intelligence model for generating the flight plan in S100. The operation S100 of training and constructing the artificial intelligence model will be described later with reference to FIGS. 4 and 5.

Subsequently, the device 200 for managing the flight plan may receive the input information including the departure location and the destination from the user terminal 100 in S200. The device 200 for managing the flight plan may receive the input information from the user terminal 100 through a user interface capable of selecting detailed data included in the input information.

FIG. 3 is a diagram illustrating an input interface capable of receiving input information.

As illustrated in FIG. 3, the input interface may be a graphical user interface. FIG. 3 illustrates the input interface on which the user may select the departure location, the destination, a required time, the preference. A detailed data list included in each of specific major items may be displayed, and the user may select one or more data from the detailed data list to input the detailed data of the corresponding item. For example, a departure location list in FIG. 3 may include Yeongjong, Cheongna, and Gyeyang, and the user may select one of Yeongjong, Cheongna, and Gyeyang to input detailed data on the departure location.

Referring back to FIG. 2, the device 200 for managing the flight plan may obtain environmental information including one or more of a wind direction, a wind velocity, a rainfall, a snowfall, a traffic volume, a noise intensity, a temperature, and a humidity in S300. The environmental information may be a factor that affects the flight. A method for acquiring the environmental information will be described with reference to FIG. 6 in details.

Subsequently, the device 200 for managing the flight plan may apply the environmental information to the artificial intelligence model in S400. That is, the device 200 for managing the flight plan may apply, to the artificial intelligence model, one or more of the wind direction, the wind velocity, the rainfall, the snowfall, the traffic volume, the noise intensity, the temperature, and the humidity included in the environmental information as data indicating a current flight environment. For example, in the artificial intelligence model, a wind direction variable env1, a wind velocity variable env2, a rainfall variable env3, a snowfall variable env4, a traffic volume variable envy, a noise intensity variable env6, a temperature variable env7, and a humidity variable env8 may be set. A weight may be applied to each of the variables. In this case, the device 200 for managing the flight plan may input each of the data included in the environment information to a corresponding variable. The traffic volume may represent the number of unmanned aerial vehicles in flight in a zone corresponding to the travel path of the unmanned aerial vehicle. The traffic volume may increase as the number of unmanned aerial vehicles flying in the flight zone increases.

Next, the device 200 for managing the flight plan may identify detailed data included in the input information in S500. The device 200 for managing the flight plan may identify one or more of the departure location, the stopover, the destination, the unmanned aerial vehicle model name, the payload, and the preference information as the detailed data.

Next, the device 200 for managing the flight plan may input the identified detailed data to the artificial intelligence model and obtain a plurality of flight plans output from the artificial intelligence model in S600. Each of the flight plans output from the artificial intelligence model may include one or more of a travel path, a takeoff scheme, an altitude climb scheme at the departure location, an arrival scheme at the destination, a landing scheme on the destination, and a flight score.

The flight score refers to a numerical value of how much the flight plan satisfies the preference. When the flight plan is established via the artificial intelligence model, the flight score of the flight plan may also be calculated by the artificial intelligence model. Further, the travel path may include a plurality of location data (e.g., GNSS coordinates) via which the unmanned aerial vehicle should sequentially travel. In other words, the artificial intelligence model may select and output an optimal takeoff path based on the detailed data of the input information and the data of the environment information.

Further, one of a predefined plurality of takeoff schemes, for example, a vertical takeoff, a takeoff using a runway, and a takeoff using a maximum power performance may be obtained from the artificial intelligence model. That is, the artificial intelligence model may select and output the optimal takeoff scheme based on the detailed data of the input information and the data of the environment information. Data corresponding to the takeoff scheme may include a velocity for takeoff, a climb direction, a target altitude, etc. The unmanned aerial vehicle may climb to the target altitude based on the velocity, the climb direction, and the target altitude included in the takeoff scheme. The takeoff using the runway may indicate a takeoff scheme in which the vehicle drives along the runway to climb up. The vertical takeoff may indicate a takeoff scheme in which the vehicle climbs in a vertical direction from the departure location. The takeoff using the runway may be applied to a fixed-wing type unmanned aerial vehicle, and the vertical takeoff may be applied to a rotary-wing type unmanned aerial vehicle.

Further, one of a plurality of predefined altitude climb schemes, for example, an altitude climb at a first velocity, an altitude climb at a second velocity, and an altitude climb at a third velocity may be obtained from the artificial intelligence model. That is, the artificial intelligence model may select and output an optimal altitude climb scheme based on the detailed data of the input information and the data of the environment information. Data corresponding to the above altitude climb scheme may include a target altitude, a climb velocity, etc. The an unmanned aerial vehicle may climb at the climb velocity until reaching the target altitude based on the altitude climb scheme.

Further, one of a plurality of predefined arrival schemes, for example, a turning descent arrival and a vertical descent arrival may be obtained from the artificial intelligence model. That is, the artificial intelligence model may select and output an optimal arrival scheme based on the detailed data of the input information and the data of the environment information. Data corresponding to the arrival scheme may include a velocity for arrival, an arrival path, etc. The unmanned aerial vehicle may attempt the arrival based on the velocity, the arrival path, etc. included in the arrival scheme.

In addition, one of a plurality of predefined landing schemes, for example, a vertical landing, a landing using a runway, and a landing using descent at a predefined angle direction may be obtained from the artificial intelligence model. In other words, the artificial intelligence model may select and output an optimal landing scheme based on the detailed data of the input information and the data of the environment information. Data corresponding to the landing scheme may include a landing velocity, a landing path, etc. The unmanned aerial vehicle may land on the destination based on the velocity, the landing path, etc. included in the landing scheme.

Next, the device 200 for managing flight plans may provide one or more of the plurality of flight plans obtained from the artificial intelligence model to the user in S700. The operation S700 will be described later in more detail with reference to FIG. 7.

According to this embodiment, the flight plan of the unmanned aerial vehicle may be established based on surrounding environment information and using the artificial intelligence model. Further, according to this embodiment, the flight plan including various information such as a takeoff scheme and a landing scheme may be generated and provided to the user.

Hereinafter, with reference to FIG. 4 and FIG. 5, the operation S100 of FIG. 2 in which the artificial intelligence model is trained and constructed will be described in more detail.

Figure 4:
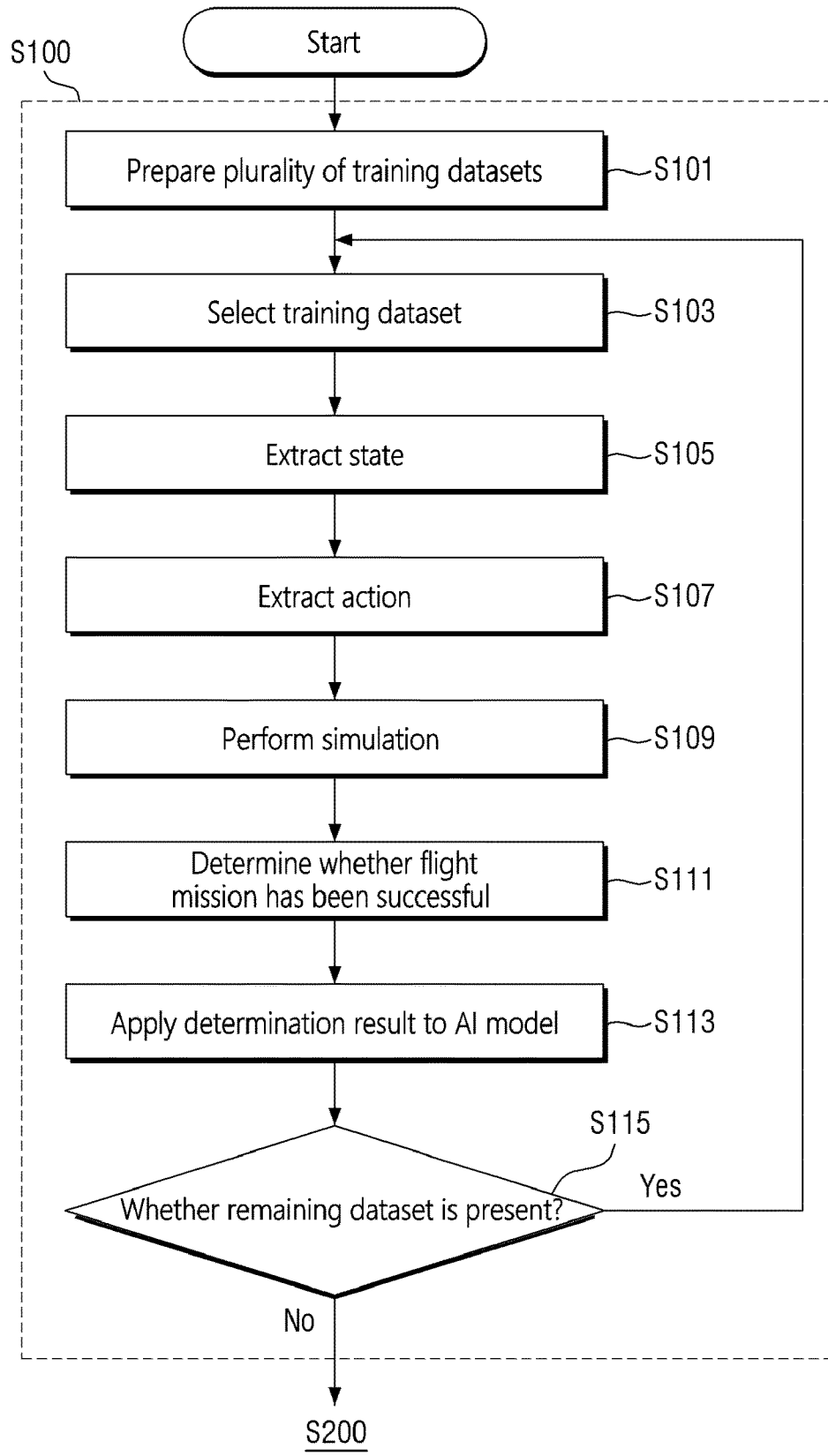
FIG. 4 is a diagram for illustrating an operation S100 of FIG. 2 in more detail.

Referring to FIG. 4, a plurality of datasets for training the artificial intelligence model may be prepared and provided in S101. Each of the datasets may include at least one of a travel path from the departure location to the destination, a temperature, a humidity, a wind velocity, a wind direction, a rainfall, a snowfall, a model name of the unmanned aerial vehicle, a payload, a traffic volume, a noise intensity, preference information, a takeoff scheme, an altitude climb scheme at the departure location, an arrival scheme at the destination, and a landing scheme on the destination.

Subsequently, the device 200 for managing the flight plan may select a dataset as a learning target to be input to the artificial intelligence model from among the plurality of datasets in S103.

Next, the device 200 for managing the flight plan may extract data indicating a state from the selected dataset in S105. In this regard, the data indicating the state may be data that may be fixed while not being selected as a flight condition. The device 200 for managing the flight plan may extract, as the data indicating the state, a temperature, a humidity, a wind velocity, a wind direction, a rainfall, a snowfall, a model name of an unmanned aerial vehicle, a payload, a traffic volume, a noise intensity, etc. from the selected dataset.

Subsequently, the device 200 for managing the flight plan may extract data indicating an action from the selected dataset in S107. In this regard, the data indicating the action may be data selected as the flight condition. The device 200 for managing the flight plan may extract, as the data indicating the action, departure location data, destination data, a travel path, preference information, a takeoff scheme, an altitude climb scheme at the departure location, an arrival scheme at the destination, a landing scheme thereon, etc. from the selected dataset.

Subsequently, the device 200 for managing the flight plan may input the data indicating the state and the data indicating the action to the artificial intelligence model to perform flight simulation of the unmanned aerial vehicle in S109.

Next, the device 200 for managing the flight plan may determine whether a flight mission to the destination has been successful based on the preference information included in the dataset and a simulation result in S111. In one embodiment, the device 200 for managing the flight plan may compare the preference information included in the dataset with the simulation result, and may determine whether the flight mission has been successful or not depending on whether the flight simulation result satisfies the preference information.

For example, when the preference information is the shortest distance flight and the travel distance of the unmanned aerial vehicle according to the simulation result exceeds the shortest distance, it may be determined that the flight mission has failed. On the contrary, when the preference information is the shortest distance flight and the travel distance of the unmanned aerial vehicle according to the simulation result is equal to or smaller than the shortest distance, it may be determined that the flight mission has been successful.

In another example, when the preference information is the longest distance flight and the travel distance of the unmanned aerial vehicle according to the simulation result is smaller than the longest distance, it may be determined that the flight mission has failed. On the contrary, when the preference information is the longest distance flight and the travel distance of the unmanned aerial vehicle according to the simulation result is equal to or greater than the longest distance, it may be determined that the flight mission has been successful.

In still another example, when the preference information is the shortest time flight and the travel time of the unmanned aerial vehicle according to the simulation result exceeds the shortest time, it may be determined that the flight mission has failed. On the contrary, when the preference information is the shortest time flight and the travel time of the unmanned aerial vehicle according to the simulation result is smaller than or equal to the shortest time, it may be determined that the flight mission has been successful.

In still yet another example, when the preference information is the longest flight time and the travel time of the unmanned aerial vehicle according to the simulation result is smaller than the longest time, it may be determined that the flight mission has failed. On the contrary, when the preference information is the longest time flight and the travel time of the unmanned aerial vehicle according to the simulation result is equal to or larger than the longest time, it may be determined that the flight mission has been successful.

In still yet another example, the preference information is the maximum payload flight. Based on a result of performing a flight simulation in a state in which the payload of the unmanned aerial vehicle is set to the maximum value, it may be identified that the unmanned aerial vehicle does not reach the destination. Thus, it may be determined that the flight mission has failed. On the contrary, the preference information is the maximum payload flight. Based on a result of performing a flight simulation in a state in which the payload of the unmanned aerial vehicle is set to the maximum value, it may be identified that the unmanned aerial vehicle reaches the destination. Thus, it may be determined that the flight mission has been successful.

In still yet another example, the preference information is the battery saving flight. A battery consumption per a unit distance of the unmanned aerial vehicle is measured. When the measured battery consumption exceeds a battery consumption required in the battery saving flight, Thus, it may be determined that the flight mission has failed. On the contrary, when the measured battery consumption is equal to or smaller than the battery consumption required in battery saving flight, it may be determined that the flight mission has been successful.

In still yet another example, the preference information is the maximum operation time flight. When the travel time of the unmanned aerial vehicle according to the simulation result does not reach the maximum operation time, it may be determined that the flight mission has failed. On the contrary, the preference information is the maximum operation time flight. When the travel time of the unmanned aerial vehicle according to the simulation result reaches the maximum operation time, it may be determined that the flight mission has been successful.

In still yet another example, the preference information is the maximum operation distance flight. When the travel distance of the unmanned aerial vehicle according to the simulation result does not reach the maximum operation distance, it may be determined that the flight mission has failed. On the contrary, when the travel distance of the unmanned aerial vehicle according to the simulation result reaches the maximum operation distance in a state where the preference information is set to the maximum operation distance flight, it may be determined that the flight mission has been successful.

In one example, when it is determined based on the result of the flight simulation that the unmanned aerial vehicle does not reach the destination, it may be determined that the flight mission has failed regardless of the preference information.

Next, the device 200 for managing the flight plan may apply the failure or success result of the flight mission to the artificial intelligence model so as to train the artificial intelligence model in S113.

In one embodiment, the artificial intelligence (AI) model may be trained according to a Deep Q Learning technique.

In this case, the device 200 for managing the flight plan may train the AI model using a following Equation 1, and may also input a value indicating the success or failure of the flight mission to a reward. The device 200 for managing the flight plan may input '0' to the reward when the flight mission has been successful based on the flight simulation result. The device 200 for managing the flight plan may input '−1' to the reward when the flight mission has failed based on the flight simulation result.

$$Q(s, a) = r(s, a) + \gamma \max_a Q(s', a) \qquad \text{Equation 1}$$

where S represents the state, a represents the action, r represents the reward, and $\gamma$ represents a discount percentage.

According to the above Equation 1, the parameters may be updated so that a sum (Q-value) of all rewards as finally received is maximized.

According to this embodiment, when the artificial intelligence model continues to be trained, a parameter included in each of layers of an artificial neural network may be adjusted to achieve what is required based on the preference information.

According to an embodiment, six degrees of freedom modeling such as a following Equation 2 may be pre-applied to the artificial intelligence model to predict a motion of the unmanned aerial vehicle.

$$m(\dot{U} - VR + WQ) = -mg\sin(\theta) + F_{A_x + F_{T_x}}$$

$$m(\dot{V} + UR - WP) = mg\sin(\Phi)\cos(\theta) + F_{A_x + F_{T_g}}$$

$$m(\dot{W} - UQ + VP) = mg\cos(\Phi\cos(\theta) + F_{A_z} + F_{T_s}$$

$$I_{xx}\dot{P} - I_{xz}\dot{R} - I_{xz}PZ + (I_{zz} - I_{yy})QR = L_A + L_T$$

$$I_{yy}\dot{Q} + (I_{xx} - I_{zz})PR + I_{xz}(P^2 - R^2) = M_A + M_T$$

$$I_{zz}\dot{R} - I_{xz}\dot{P} + (I_{yy} - I_{xx})PQ + I_{xz}QR = N_A + N_T \qquad \text{Equation 2}$$

Definitions of variables and constants in the above Equation 2 are as follows:

m=a mass
g=an acceleration of gravity
U=a roll axis (x axis) velocity
V=a pitch axis (y-axis) velocity
W=a yaw axis (z-axis) velocity
$\dot{U}$=a change over time in a roll axis (x-axis) velocity
$\dot{V}$=a change over time in a pitch axis (y-axis) velocity
$\dot{W}$=a change over time in a yaw axis (z-axis) velocity
P=a roll angular velocity
Q=a pitch angular velocity
R=a yaw angular velocity
$\dot{P}$=a change over time in a roll angular velocity
$\dot{Q}$=a change over time in a pitch angular velocity
$\dot{R}$=a change over time in a yaw angular velocity
$F_{A_x}$=an x-component of a total force vector acting on an unmanned aerial vehicle under an aerodynamic force
$F_{A_y}$=a y-component of a total force vector acting on an unmanned aerial vehicle under an aerodynamic force
$F_{A_z}$=a z-component of a total force vector acting on an unmanned aerial vehicle under an aerodynamic force
$F_{T_x}$=an x-component of a total force vector acting on an unmanned aerial vehicle by a propulsion engine
$F_{T_y}$=a y-component of a total force vector acting on an unmanned aerial vehicle by a propulsion engine $F_{T_z}$=a z-component of a total force vector acting on an unmanned aerial vehicle by a propulsion engine $K_A = L_A \hat{i} + M_A \hat{j} + N_A \hat{k}$, a total moment vector sum on a center of mass of an unmanned aerial vehicle as caused by an aerodynamic force $O_T = L_T \hat{i} + M_T \hat{j} + N_T \hat{k}$, a total moment vector sum on a center of mass of an unmanned aerial vehicle as caused by a thrust of a propulsion engine $L_A$=a rolling moment component of $K_A$
$M_A$=a pitch moment component of $K_A$
$N_A$=a yawing moment component of $K_A$
$L_T$=a rolling moment component of $O_T$
$M_T$=a pitch moment component of $O_T$
$N_T$=a yawing moment component of $O_T$ $$I = \begin{vmatrix} I_{xx} & -I_{xy} & -I_{xz} \\ -I_{yx} & I_{yy} & -I_{yz} \\ -I_{zx} & -I_{zy} & I_{zz} \end{vmatrix}$$

$I_{ij}$=principal moment of inertia
$I_{ji}$(i≠j) being product of inertia

In some embodiments, the device 200 for managing the flight plan may model a wind using a following Equation 3 and apply the modeled wind to the artificial intelligence model.

$$W_N = W \cos(\Psi)_w$$

$$W_E = -W \sin(\Psi)_w \quad \text{Equation 3}$$

Definition of variables or constants in the Equation 3 is as follows:

$W_N$=a wind velocity in a north direction
$W_E$=a wind velocity in an east direction
$W$=a wind velocity based on an altitude
$\Psi_W$=a wind direction angle The device 200 for managing the flight plan may model the wind based on the wind velocity and the wind direction included in the dataset and the above Equation 3.

In one embodiment, the device 200 for managing the flight plan may acquire the noise intensity using a following Equation 4, and may model the acquired noise intensity, and apply the modelled acquired noise intensity to the artificial intelligence model.

$$L_{w,f,m,i} = \quad \text{Equation 4}$$
$$E_{aircraft,t,i} + c_{v,f,i} \log\left(\frac{v_i}{v_o}\right) + 10 \log n_i + C_{track,f,m} + C_{corridor,f,m}$$

In the Equation 4, $L_{w,f,m,i}$ denotes the noise intensity; $E_{aircraft,t,i}$ denotes an equivalent level (dB) of a sound intensity at each octave band as emitted from an air corridor of a unit length when the unmanned aerial vehicle passes through an air corridor under a reference condition; $c_{v,f,i}$ denotes a velocity coefficient; $v_i$ denotes a velocity of the unmanned aerial vehicle; $v_o$ denotes a reference velocity of the unmanned aerial vehicle; $n_i$ denotes the number of unmanned aerial vehicles that have passed; $C_{track,f,m}$ denotes a correction value based on a trajectory of the unmanned aerial vehicle; and $C_{corridor,f,m}$ denotes a correction value based on an air corridor condition.

In one embodiment, the device 200 for managing the flight plan may identify $n_i$ as the number of the unmanned aerial vehicles that have passed, based on the traffic volume included in the dataset, and apply the $n_i$ to the Equation 4.

In some embodiments, a result value calculated by applying a predefined weight to the traffic volume may be identified as $n_i$. $C_{track,f,m}$ and $C_{corridor,f,m}$ may be preset.

Referring back to FIG. 4, the device 200 for managing the flight plan may determine whether a dataset not input to the artificial intelligence model is present among prepared training datasets in S115. When it is determined that the dataset that is not input to the artificial intelligence model is present among the prepared training datasets, the device 200 for managing the flight plan may perform the operation S103 again to select a dataset as a learning target from among a plurality of datasets that are not input to the artificial intelligence model. Then, the device 200 may extract action data and state data from the selected dataset and input the extracted data to the artificial intelligence model. In this way, the artificial intelligence model may be trained.

In the above process, the artificial intelligence model for establishing the flight plan of the unmanned aerial vehicle may be trained and constructed.

Figure 5:
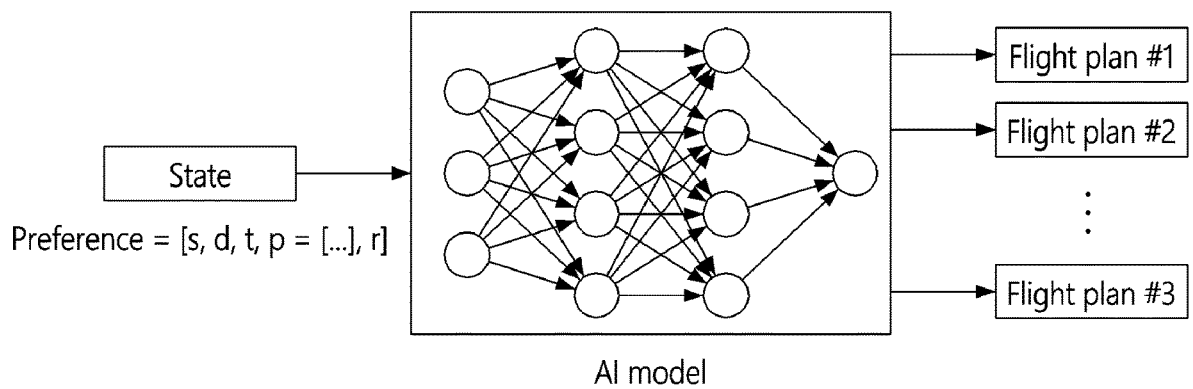
FIG. 5 is a diagram illustrating an artificial intelligence model.

FIG. 5 is a diagram illustrating an artificial intelligence model.

FIG. 5 illustrates that when the state information and the preference information are input to the artificial intelligence model, the artificial intelligence model outputs a plurality of flight plans. In this regard, the preference may be expressed as a vector value. For example, 's' in the preference information may indicate the shortest distance flight. When 's' is expressed as 1, this may indicate that the preference information is set as the shortest distance flight. In another example, 'd' in the preference information may indicate the shortest time flight. When 'd' is expressed as 1, this may indicate that the preference information is set as the shortest distance flight.

FIG. 5 illustrates that the AI model outputs the plurality of flight plans. Each of the flight plans may include one or more of a travel path, a takeoff scheme, an altitude climb scheme at the departure location, an arrival scheme at the destination, and a landing scheme thereon. That is, a flight method from the departure location to the destination, an arrival method at a specific point, a flight score, and the like may be recorded in the flight plan.

Figure 6:
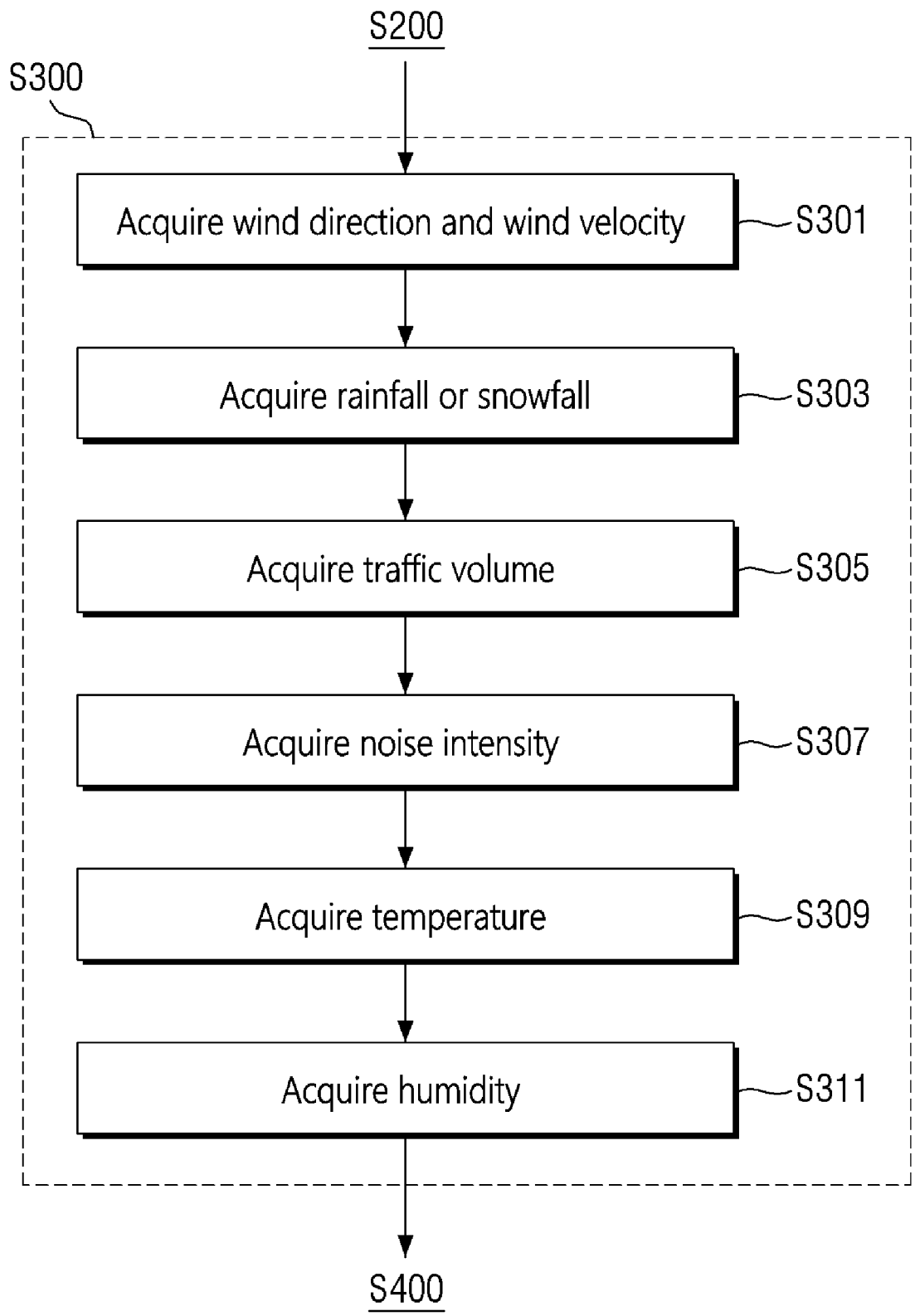
FIG. 6 is a diagram for illustrating an operation S300 of FIG. 2 in more detail.

Referring to FIG. 6, the operation S300 of FIG. 2 of acquiring the environmental information will be described in more detail.

The device 200 for managing the flight plan may acquire a wind direction and a wind velocity in a flight zone from a weather measurement server (not shown) that measures weather in S301. In this regard, the flight zone may be an administrative zone including a path along which the unmanned aerial vehicle travels.

Subsequently, the device 200 for managing the flight plan may obtain the rainfall or the snowfall in the flight zone in S303.

The device 200 for managing the flight plan may obtain the traffic volume in the flight zone from a control server (not shown) that controls the unmanned aerial vehicle in the flight zone in S305. In this regard, the traffic volume may represent the number of unmanned aerial vehicles in flight in a zone corresponding to the travel path of the unmanned aerial vehicle. The control server may collect the traffic volume in real time.

Subsequently, the device 200 for managing the flight plan may obtain the noise intensity using the above Equation 4 in S307. In one embodiment, the device 200 for managing the flight plan may identify $n_i$ as the number of unmanned aerial vehicles that have passed, based on the obtained traffic volume, and apply the $n_i$ to the Equation 4.

Next, the device 200 for managing the flight plan may acquire the temperature in the flight zone from the weather measurement server in S309. Further, the device 200 for managing the flight plan may acquire the humidity in the flight zone from the weather measurement server in S311.

Figure 7:
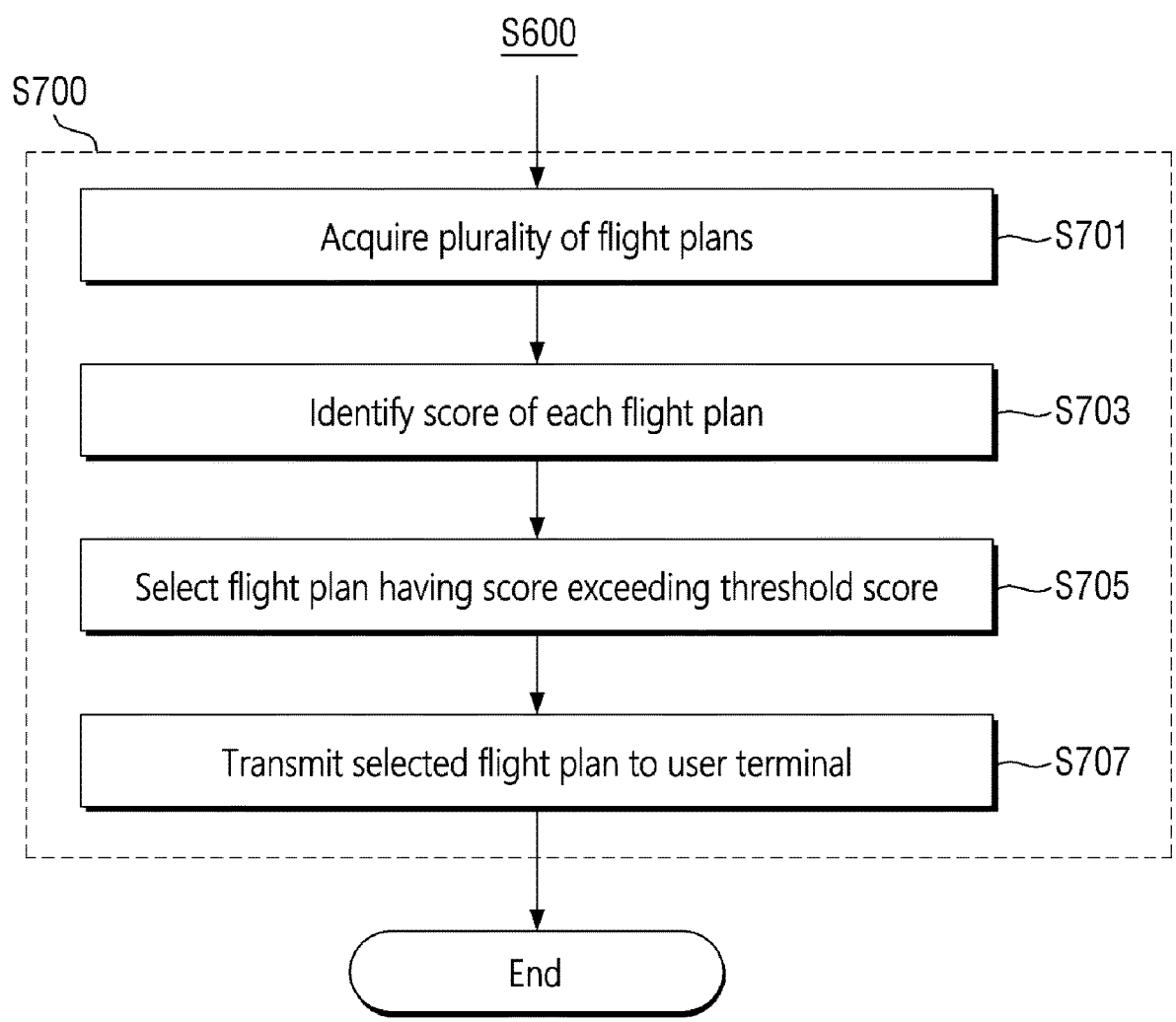
FIG. 7 is a diagram for illustrating an operation S700 of FIG. 2 in more detail.

Referring to FIG. 7, the operation S700 of FIG. 2 of providing the flight plan will be described in more detail.

The device 200 for managing the flight plan may obtain the plurality of flight plans output from the artificial intelligence model in S701. A flight score by which each of the flight plans meets the preference information may be recorded in each of the flight plans.

Subsequently, the device 200 for managing the flight plan may identify the flight score of each of the acquired flight plans in S703.

Next, the device 200 for managing flight plans may select one or more flight plans whose the flight score exceeds a preset threshold score from the plurality of flight plans in S705. Subsequently, the device 200 for managing flight plans may transmit the selected one or more flight plans to the user terminal 100 in S707.

In some embodiments, the device 200 for managing flight plans may sort the flight plans in an increasing order of the flight scores as identified, and selects one or more flight plans belonging to a predefined ranking, and then may send the selected one or more flight plans to the user terminal 100.

Hereinafter, a illustrative hardware configuration of a computing device according to some embodiments of the present disclosure will be described with reference to FIG. 8. The computing device as described with reference to FIG. 8 may have, for example, a hardware configuration of the device 200 for managing the flight plan as described with reference to FIGS. 1 to 7.

Figure 8:
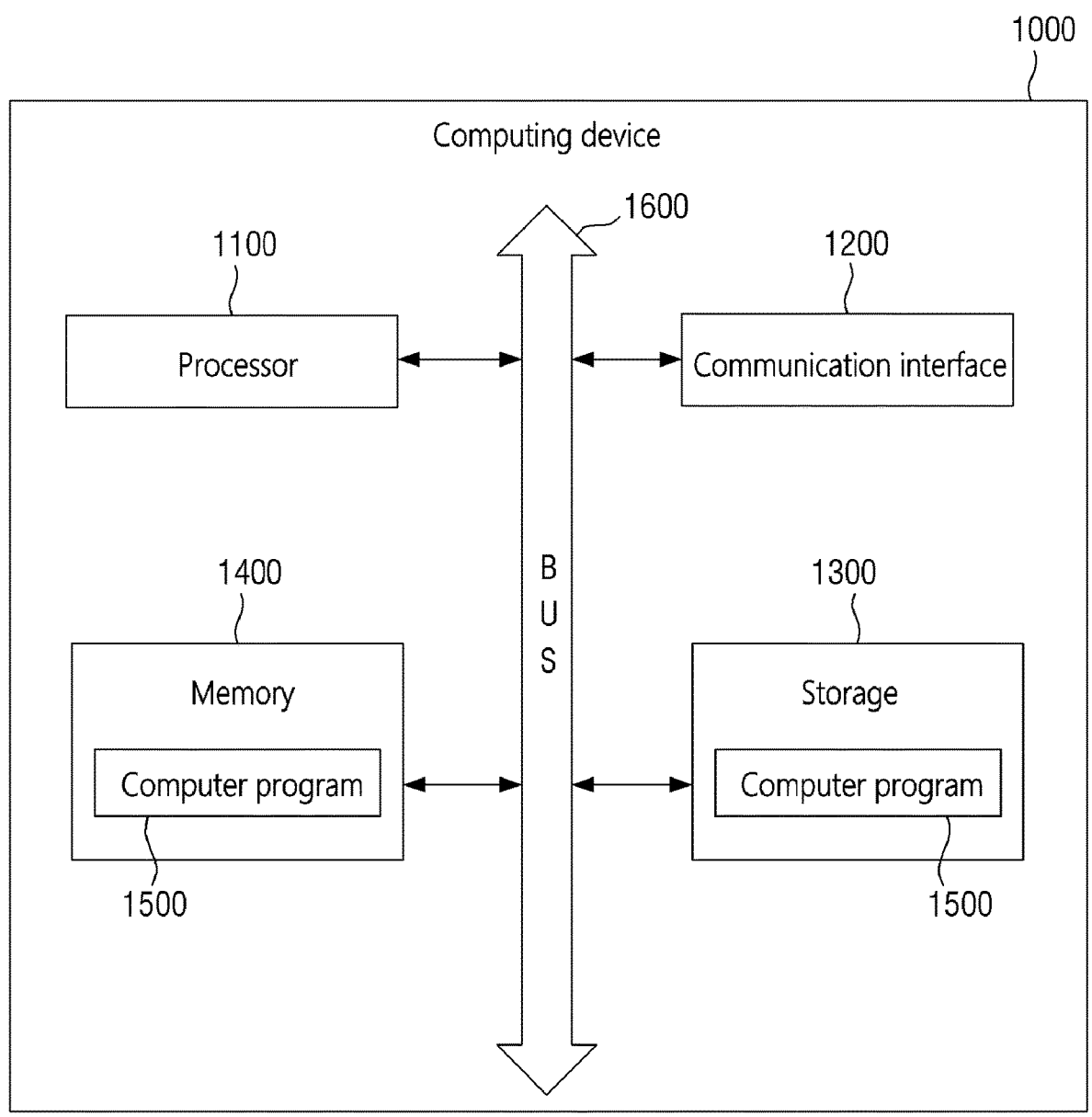
FIG. 8 is an illustrative hardware configuration diagram that can implement a computing device in various embodiments of the present disclosure.

FIG. 8 is a hardware configuration diagram of an exemplary computing device 100.

Referring to FIG. 8, the computing device 1000 may include one or more processors 1100, a bus 1600, a communication interface 1200, a memory 1400, which loads a computer program 1500 executed by the processors 1100, and a storage 1300 for storing the computer program 1500.

The processor 1100 controls overall operations of each component of computing device 1000. The processor 1100 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 1000 may have one or more processors.

The memory 1400 stores various data, instructions and/or information. The memory 1400 may load one or more programs 1500 from the storage 1300 to execute methods/operations according to various embodiments of the present disclosure. An example of the memory 1400 may be a RAM, but is not limited thereto.

The bus 1600 provides communication between components of computing device 1000. The bus 1600 may be implemented as various types of bus such as an address bus, a data bus and a control bus.

The communication interface 1200 supports wired and wireless internet communication of the computing device 1000. The communication interface 1200 may support various communication methods other than internet communication. To this end, the communication interface 1200 may be configured to comprise a communication module well known in the art of the present disclosure.

The storage 1300 can non-temporarily store one or more computer programs 1500. The storage 1300 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1500 may include one or more instructions, on which the methods/operations according to various embodiments of the present disclosure are implemented. When the computer program 1500 is loaded on the memory 1400, the processor 1100 may perform the methods/operations in accordance with various embodiments of the present disclosure by executing the one or more instructions.

In one embodiment, the computer program 1500 may include instructions for performing the operation of receiving the input information including the departure location and the destination of the unmanned aerial vehicle, the operation of inputting the input information to the pre-constructed artificial intelligence model, the operation of acquiring, from the artificial intelligence model, at least one of the travel path, the takeoff scheme, the altitude climb scheme at the departure location, and the arrival scheme at and the landing scheme on the destination, and the operation of generating the flight plan including the obtained at least one of the travel path, the takeoff scheme, the altitude climb scheme at the departure location, and the arrival scheme at and the landing scheme on the destination.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for managing, by a computing device, a flight plan of an unmanned aerial vehicle, the method comprising:
receiving, from a user terminal, input information including a departure location and a destination of the unmanned aerial vehicle, the input information being selected based on a user input on a user interface displayed in the user terminal;

inputting the input information into a pre-constructed artificial intelligence model;

outputting a plurality of flight plans including at least one of a travel path, a takeoff scheme, an altitude climb scheme at the departure location, an arrival scheme at the destination, or a landing scheme on the destination from the artificial intelligence model;

transmitting, to the user terminal, at least one flight plan among the plurality of flight plans; and controlling the unmanned aerial vehicle based on the at least one flight plan, wherein the pre-constructed artificial intelligence model is a model trained by adjusting parameters so that the sum of rewards calculated using state and actions included in training datasets is maximized, wherein the state includes at least one of departure location information, stopover information, destination information, a type of the unmanned aerial vehicle, or a payload of the unmanned aerial vehicle, wherein the actions include at least one of a takeoff scheme, an altitude climb scheme at the departure location, an arrival scheme at the destination, or a landing scheme on the destination, wherein the method further comprises:

prior to the inputting of the input information to the pre-constructed artificial intelligence model, acquiring environmental information including at least one of a traffic volume, a noise intensity, a wind velocity, and a wind direction along a flight path from the departure location to the destination; and applying the environmental information to the artificial intelligence model, and wherein the acquiring of the environmental information includes acquiring the noise intensity based on a following Equation:

$$L_{w,f,m,i} = E_{aircraft,t,i} + C_{v,f,i} \log(v_i/v_o) + 10\log n_i + C_{track,f,m} + C_{corridor,f,m}$$

where $L_{w,f,m,i}$ denotes the noise intensity;

$E_{aircraft,t,i}$ denotes an equivalent level in decibels (dB) of a sound intensity at each octave band as emitted from an air corridor of a unit length when the unmanned aerial vehicle passes through an air corridor under a reference condition;

$C_{v,f,i}$ denotes a velocity coefficient;

$v_i$ denotes a velocity of the unmanned aerial vehicle;

$v_o$ denotes a reference velocity of the unmanned aerial vehicle;

$n_i$ denotes the number of unmanned aerial vehicles that have passed through the flight path;

$C_{track,f,m}$ denotes a correction value based on a trajectory of the unmanned aerial vehicle; and $C_{corridor,f,m}$ denotes a correction value based on an air corridor condition.

2. The method of claim 1, wherein the acquiring of the noise intensity identifying the number $n_i$ of the unmanned aerial vehicles that passed through the flight path, based on the traffic volume of the flight path.

3. The method of claim 1, wherein the outputting a plurality of flight plans including the at least one of the travel path, the takeoff scheme, the altitude climb scheme at the departure location, the arrival scheme at the destination, or the landing scheme on the destination includes:

acquiring, as the takeoff scheme, one of a vertical takeoff, a takeoff using a runway, and a takeoff using a maximum power performance; and selecting, as the altitude climb scheme at the departure location, one of an altitude climb at a first velocity and an altitude climb at a second velocity.

4. The method of claim 1, wherein the outputting a plurality of flight plans including the at least one of the travel path, the takeoff scheme, the altitude climb scheme at the departure location, the arrival scheme at the destination, or the landing scheme on the destination includes:

selecting, as the arrival scheme at the destination, one of a turning descent arrival and a vertical descent arrival; and acquiring, as the landing scheme on the destination, one of a vertical landing, a landing using a runway, and a landing using descent at a predefined angle direction.

5. The method of claim 1, wherein the inputting of the input information to the pre-constructed artificial intelligence model includes inputting preference information to the artificial intelligence model, wherein the preference information is considered in a preferred manner in flight of the unmanned aerial vehicle, wherein the outputting a plurality of flight plans including the at least one of the travel path, the takeoff scheme, the altitude climb scheme at the departure location, the arrival scheme at the destination, or the landing scheme on the destination includes:

acquiring the at least one of the travel path, the takeoff scheme, the altitude climb scheme at the departure location, the arrival scheme at the destination, or the landing scheme on the destination, based on the preference information.

6. The method of claim 1, further comprising:

applying the state and the actions included in the training datasets to the artificial intelligence model;

determining whether a flight mission based on each of the training datasets has been successful or failed; and applying the determination result to the artificial intelligence model to train the artificial intelligence model.

7. A method for managing, by a computing device, a flight plan of an unmanned aerial vehicle, the method comprising:

inputting a departure location and a destination of the unmanned aerial vehicle, received from a user terminal, to an artificial intelligence model such that the artificial intelligence model outputs a plurality of flight plans;

selecting at least one of the plurality of flight plans;

transmitting, to the user terminal, the selected at least one flight plan; and controlling the unmanned aerial vehicle based on the selected at least one flight plan, wherein the artificial intelligence model is a model trained by adjusting parameters so that the sum of rewards calculated using state and actions included in training datasets is maximized, wherein the state includes at least one of departure location information, stopover information, destination information, a type of the unmanned aerial vehicle, or a payload of the unmanned aerial vehicle, wherein the actions include at least one of a takeoff scheme, an altitude climb scheme at the departure location, an arrival scheme at the destination, or a landing scheme on the destination, wherein the method further comprises:

prior to the inputting of the input information to the artificial intelligence model, acquiring environmental information including at least one of a traffic volume, a noise intensity, a wind velocity, and a wind direction along a flight path from the departure location to the destination; and applying the environmental information to the artificial intelligence model, and wherein the acquiring of the environmental information includes acquiring the noise intensity based on a following Equation:

$$L_{w,f,m,i} = E_{aircraft,t,i} + C_{v,f,i}\log(v_i/v_o) + 10\log n_i + C_{track,f,m} + Cc_{orridor,f,m}$$

where $L_{w,f,m,i}$ denotes the noise intensity;

$E_{aircraft,t,i}$ denotes an equivalent level in decibels (dB) of a sound intensity at each octave band as emitted from an air corridor of a unit length when the unmanned aerial vehicle passes through an air corridor under a reference condition;

$C_{v,f,i}$ denotes a velocity coefficient;

$v_i$ denotes a velocity of the unmanned aerial vehicle;

$v_o$ denotes a reference velocity of the unmanned aerial vehicle;

$n_i$ denotes the number of unmanned aerial vehicles that have passed through the flight path;

$C_{track,f,m}$ denotes a correction value based on a trajectory of the unmanned aerial vehicle; and $C_{corridor,f,m}$ denotes a correction value based on an air corridor condition.

8. The method of claim 7, wherein the inputting of the departure location and the destination of the unmanned aerial vehicle to the artificial intelligence model such that the artificial intelligence model outputs the plurality of flight plans includes:

acquiring environmental information including at least one of a weather, a traffic volume, and a noise intensity affecting flight of the unmanned aerial vehicle; and inputting the environmental information to the artificial intelligence model.

9. The method of claim 7, wherein the inputting of the departure location and the destination of the unmanned aerial vehicle to the artificial intelligence model such that the artificial intelligence model outputs the plurality of flight plans includes:

inputting preference information to the artificial intelligence model, wherein the preference information is considered in a preferred manner in flight of the unmanned aerial vehicle;

outputting, by the artificial intelligence model, the plurality of flight plans including at least one of a travel path, a takeoff scheme, an altitude climb scheme at the departure location, an arrival scheme at the destination, or a landing scheme on the destination, based on the preference information.

10. A computing device comprising:

at least one processor;

a memory for loading thereon a computer program executed by the processor; the memory comprising storage for storing therein the computer program, wherein the computer program includes instructions for:

receiving, from a user terminal, input information including a departure location and destination of an unmanned aerial vehicle, the input information being selected based on a user input on a user interface displayed in the user terminal;

inputting the input information to a pre-constructed artificial intelligence model;

outputting a plurality of flight plans including at least one of a travel path, a takeoff scheme, an altitude climb scheme at the departure location, an arrival scheme at the destination, or a landing scheme on the destination from the artificial intelligence model;

transmitting, to the user terminal, at least one flight plan among the plurality of flight plans; and controlling the unmanned aerial vehicle based on the at least one flight plan, wherein the pre-constructed artificial intelligence model is a model trained by adjusting parameters so that the sum of rewards calculated using state and actions included in training datasets is maximized, wherein the state includes at least one of departure location information, stopover information, destination information, a type of the unmanned aerial vehicle, or a payload of the unmanned aerial vehicle, wherein the actions include at least one of a takeoff scheme, an altitude climb scheme at the departure location, an arrival scheme at the destination, or a landing scheme on the destination, wherein the computer program further includes instructions for:

prior to the inputting of the input information to the pre-constructed artificial intelligence model, acquiring environmental information including at least one of a traffic volume, a noise intensity, a wind velocity, and a wind direction along a flight path from the departure location to the destination; and applying the environmental information to the artificial intelligence model, and wherein the acquiring of the environmental information includes acquiring the noise intensity based on a following Equation:

$$L_{w,f,m,i} = E_{aircraft,t,i} + c_{v,f,i}\log\left(\frac{v_i}{v_o}\right) + 10\log n_i + C_{track,f,m} + C_{corridor,f,m}$$

where $L_{w,f,m,i}$ denotes the noise intensity;

$E_{aircraft,t,i}$ denotes an equivalent level in decibels (dB) of a sound intensity at each octave band as emitted from an air corridor of a unit length when the unmanned aerial vehicle passes through an air corridor under a reference condition;

$C_{v,f,i}$ denotes a velocity coefficient;

$v_i$ denotes a velocity of the unmanned aerial vehicle;

$v_o$ denotes a reference velocity of the unmanned aerial vehicle;

$n_i$ denotes the number of unmanned aerial vehicles that have passed through the flight path;

$C_{track,f,m}$ denotes a correction value based on a trajectory of the unmanned aerial vehicle; and $C_{corridor,f,m}$ denotes a correction value based on an air corridor condition.

* * * * *